Sept. 11, 1962   B. B. SILVERMAN   3,053,011
SYSTEM AND APPARATUS FOR HYDROPONIC GROWING
Filed March 1, 1960   7 Sheets-Sheet 3

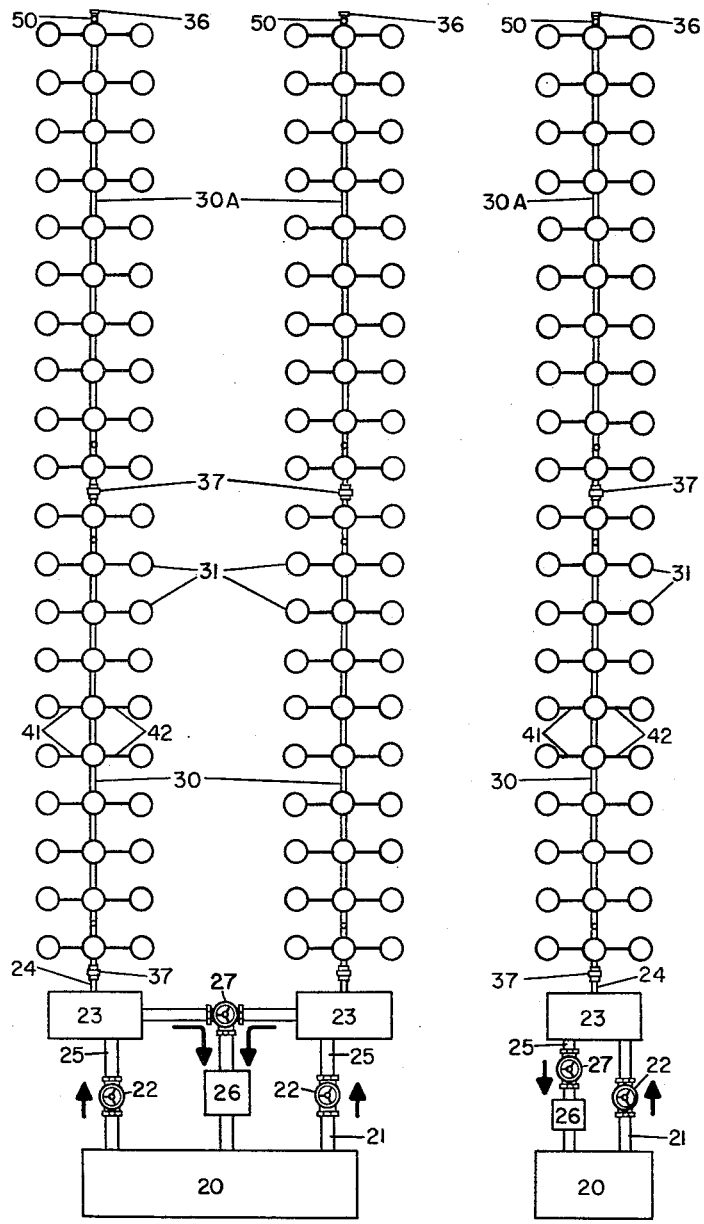

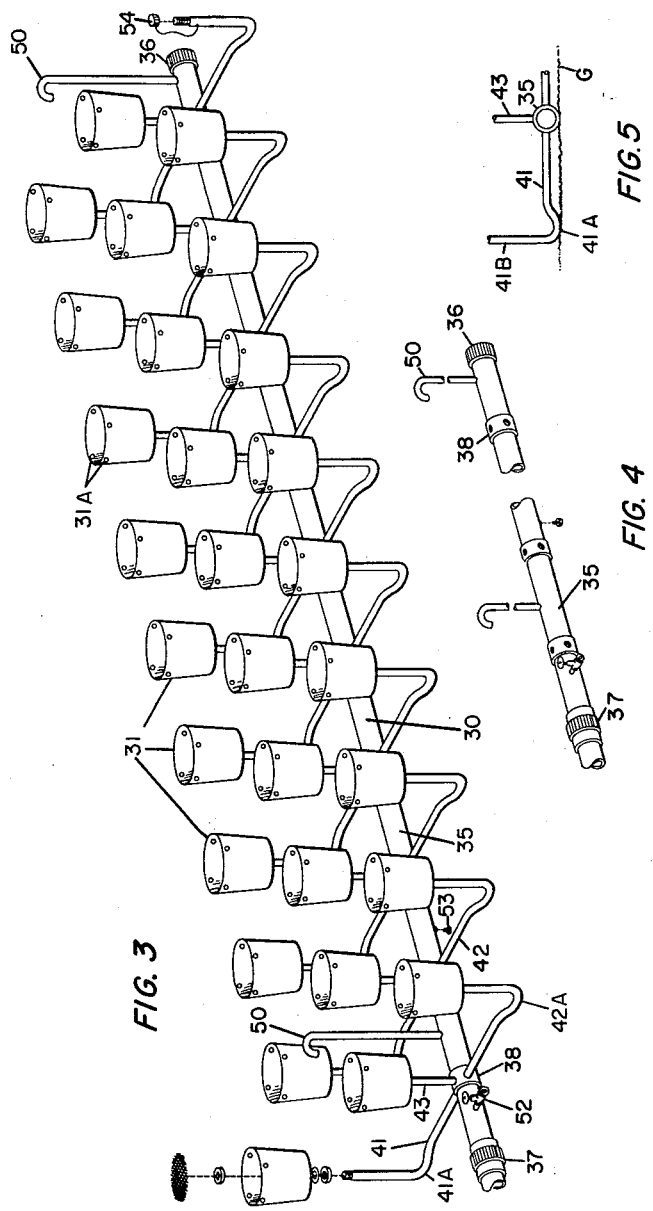

INVENTOR
BENJAMIN B. SILVERMAN

BY
ATTORNEY

Sept. 11, 1962　　　　　B. B. SILVERMAN　　　　　3,053,011
SYSTEM AND APPARATUS FOR HYDROPONIC GROWING
Filed March 1, 1960　　　　　　　　　　　　7 Sheets-Sheet 6
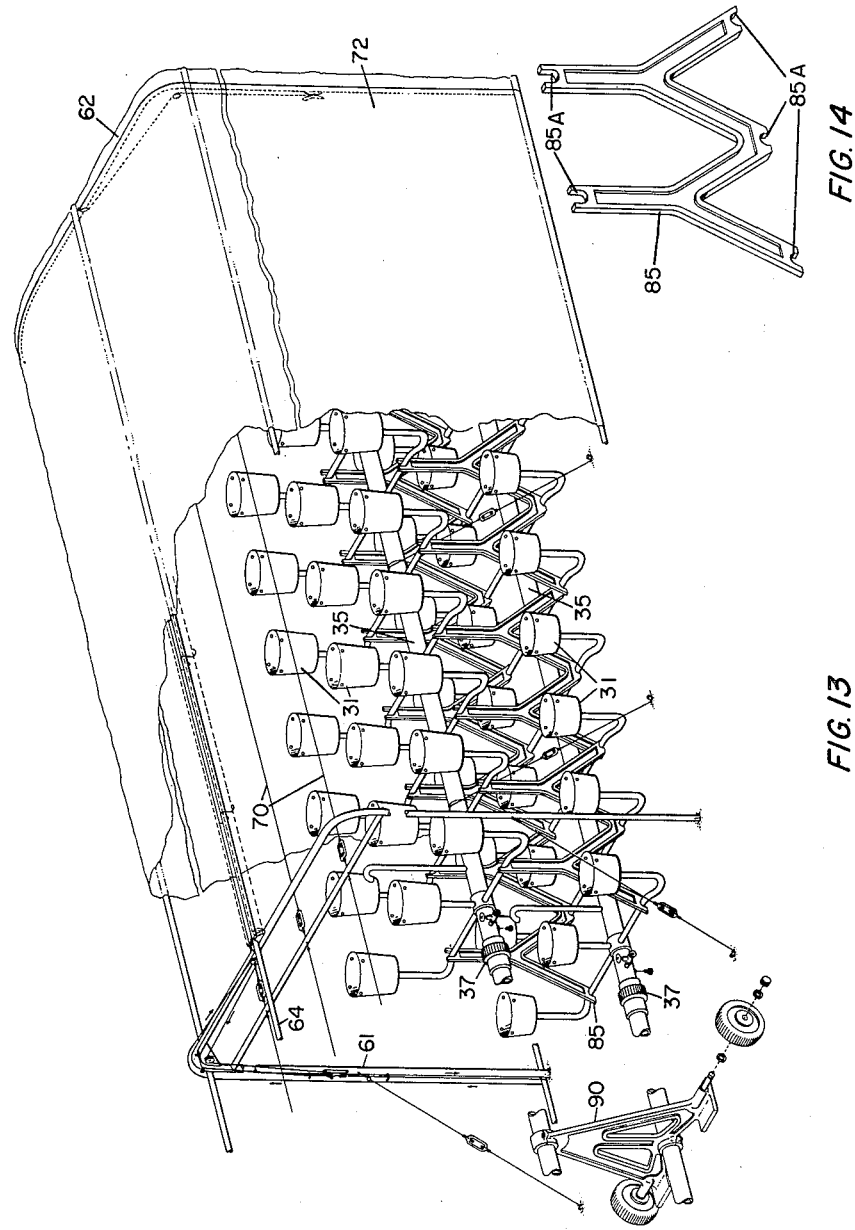
INVENTOR
BENJAMIN B. SILVERMAN
BY *Roy E. Raney*
　　　　ATTORNEY 3,053,011
SYSTEM AND APPARATUS FOR HYDROPONIC GROWING
Benjamin B. Silverman, 219 Buena Vista Drive, Dunedin, Fla.
Filed Mar. 1, 1960, Ser. No. 12,149
5 Claims. (Cl. 47—38)

The present invention relates to improved system and apparatus for the hydroponic growing of plants or other vegetation such as tomatoes, strawberries, cucumbers, flowers, ornamentals, shrubs, trees, fungi, etc.

It is well known that certain vegetation or plants can be grown without soil by supplying the roots thereof with aqueous solutions containing certain elements and chemicals nutritious to the plants. This practice is known by such terms as hydroponics, nutrient solution culture, sub-irrigation culture, tank farming, etc., and is generally carried out on a commercial scale in permanently installed, trough-like waterproofed beds, generally of concrete, located in the ground and filled with a growing medium, such as river pebble, and having a suitable feeding solution circulated therethrough by pumping equipment or a gravity feed system, the plants being grown in the beds by supplying the feeding solution which contains the essential nutritional elements to the roots in the growing medium.

The principal object of the present invention is the provision of a system and apparatus for hydroponic growing comprising a multiplicity of containers or individual growing beds each of a size to accommodate a convenient minimal growing unit, such as a single plant or a group of plants and each bed is connected by substantially closed conduits to a reservoir of plant feeding solution or the like, means being provided by which the solution can be directed through the conduits to and from the beds to periodically irrigate the roots of the plants in the growing medium contained in the beds with said solution, the level of the solution in the beds being uniform and controllable. Plant growing systems utilizing the present invention compared with prior known hydroponic systems of like growing capacity are substantially more economical and they are capable of producing superior plant growth. The individual growing beds supplied with the feeding solution through closed conduits provide closer regulation and control of plant feeding than was heretofore possible and effect considerable reduction in water requirements, for a given growing capacity, which enables use of solution handling equipment of a relatively low capacity and which is comparatively economical to install and maintain. Furthermore, the closed conduit system materially reduces the possibility of contamination in the system, thereby inhibiting the introduction and spread of plant disease and fungi deleterious to plant growth, and, if desired, cleansing fluids, either liquid or gases, can be easily introduced into the system to decontaminate and sterilize the entire apparatus.

In carrying out the preferred form of the invention, the growing system comprises apparatus including one or more complete units or modules, a module being defined here as a device consisting of a number of component parts of unitized or complex construction which may be arranged in such a manner as to form a complete growing apparatus of varying size, shape, configuration, and growing capacity. Each module comprises a conduit structure and a multiplicity of individual growing beds. The conduit structure serves as a means of transferring the solution to and from the individual growing beds and in its preferred form, also serves as a support for the apparatus, which can easily be installed on, over, in and under various types of man-made and natural surfaces to provide a compact growing system of almost any desired capacity and configuration, according to the growing requirements and the available site, and little or no alteration of ground areas or surfaces is required for installation of the modular hydroponic system. The required amount of feeding solution is supplied to the conduit system under a pressure which provides a desirable level or depth of solution in the beds, and the conduit system has means, such as air vents, to aerate the solution and also to enable the solution to flow freely and uniformly to and from the individual beds. Preferably each module comprises a generally horizontal main conduit having branch conduits attached thereto, some of which may extend laterally of the main conduit, and which terminate in upright sections to which individual growing beds are attached, means being provided for adjusting the vertical positions of the beds on the branch conduits so that the level of the feeding solution in each bed can be closely regulated by adjusting the elevation of the bed.

Another object of the present invention is the provision of apparatus of the character described in which the beds may be individually detached from the conduit system without disturbing the basic structure or normal operation of the system. This permits the removal of individual growing beds, with the plants contained therein, for commercial sale, as well as for disease isolation, pollination control, regrouping, and also for controlled testing and observation as is frequently desired in agricultural experimental studies and as is necessary to assure consistent quality control in commercial crops.

A further object of the invention is the provision of apparatus of the character mentioned having means to prevent infiltration of the growing medium as well as creepage of the roots of the plants in the beds into the branch conduits to which the beds are connected.

Another object of the invention is the provision of apparatus of the character described which can be mounted with ease on wheels, skids, rollers, or various other types of mobile base or structure, to achieve complete mobility, and which also, depending on size, can be lifted and transported without being disassembled.

Another object of the invention is the provision of apparatus of the type described whose configuration requires minimum space, or growing area, for any given growing capacity.

A still further object of the invention is the provision of apparatus of the character mentioned in which the bed comprise an open-top container having an annular removable cover of approprite material and color for substantially closing the open tops of the beds above the stems of the plants to assist in preventing development of disease caused by spores, micro-organisms, and other extraneous matter which might enter the growing beds, to aid in retention of moisture in the growing medium, and to provide relative retention of radiated heat.

Another object of the invention is the provision of apparatus of the character described having valve means to drain the individual modules so that rain water or other excess fluid can be readily removed from the system and other means, such as a test part from which test samples of the feeding solution can be readily taken from time to time.

Other objects and advantages of the invention will be apparent from the following description of preferred forms thereof, reference being made to the accompanying drawings, wherein:

FIG. 1 is a schematic plan view of a hydroponic system embodying the invention;

FIG. 2 is a view similar to FIG. 1 but showing an enlarged system similar to that of FIG. 1;

FIG. 3 is a perspective view, partly exploded, of a growing unit or module of a system embodying the invention;

FIG. 4 is a perspective view of the apparatus shown in FIG. 3, parts of which are shown broken away and other parts removed;

FIG. 5 is a fragmentary end view of the apparatus shown in FIG. 3;

FIG. 13 is a view similar to FIG. 12 but showing still another form of tiered modules;

FIG. 14 is a perspective view of a support unit utilized in the apparatus shown in FIG. 13.

Figure 6:
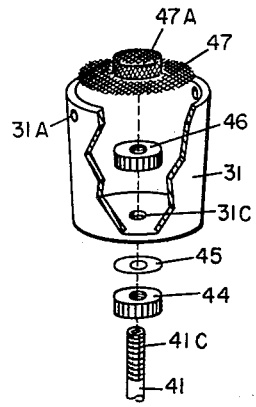
FIG. 6 is a fragmentary perspective view of apparatus shown in FIG. 3 but showing certain parts exploded.

Referring to FIG. 1, an hydroponic growing system embodying the invention is shown schematically and it comprises a main reservoir 20 in which suitable solutions may be contained, such as an aqueous solution including various nutritional elements and chemicals, and which reservoir has an outlet conduit 21 connected therewith which leads by way of a manual control valve 22 to a pressure regulating device 23 located at a lower level so that the solution flows from the reservoir to the pressure regulator by gravity.

Device 23 comprises a tank or receptacle having an outlet 24 leading to the conduits for the growing beds, as described more fully hereinafter, and the level of solution in the tank is maintained by a float valve, not shown, as long as valve 22 is open, so that the solution is discharged through outlet 24 at a given pressure. Any other suitable pressure regulator for feeding solution to the system under a given head pressure could be employed. Solution in the system can be returned through regulator 23 to reservoir 20 by way of a return conduit 25 which leads from tank 23 to the inlet of a pump 26 which discharges into main reservoir 20, and, preferably, a valve 27 is interposed between outlet pipe 25 and the inlet of pump 26. By the arrangement described, the solution in reservoir 20 can be fed under a given head pressure to the conduit system and withdrawn and returned to the reservoir by controlling the valves and pump. If desired, the valves 22 and 27, as well as pump 26, can be controlled by suitable automatic devices.

Discharge pipe 24 is connected to one end of a conduit of module 30 which includes a plurality of individual growing beds 31, each being supplied with the particular solution discharging from outlet 24 as described in greater detail hereinafter. A second modular unit 30A like module 30 is attached by a coupling 37 to the module 30 and, if desired, additional like modules could be similarly attached to one another by couplings so that all could receive a solution from tank 20. By controlling valves 22 and 27 and pump 26, plant feeding or treating solution can be flooded into the beds 31 of the modules and then periodically withdrawn therefrom for controlling the feeding or treating of plants in the beds.

Referring more particularly to FIG. 3, module 30 is shown in detail and it comprises a main relatively rigid tubular conduit 35 generally disposed horizontally and which may be formed of any suitable material and, by way of example, may be of a plastic, such as polyvinyl chloride, and is approximately two inches in diameter and ten feet in length. Opposite ends of conduit 35 are threaded so that these ends may either be closed as by threading a cap 36 thereon, or the end may be coupled with another conduit of a like module as by a conventional threaded coupling or union 37. Preferably, conduit 35 is reenforced at intervals therealong by collars 38 which are tightly joined thereto, as by fusing or welding, and rigid branch conduits 41, 42 and 43 of like material, are attached in openings through the main tubular conduit 35 and collars 38, as by fusing or welding, so that liquid in conduit 35 may flow into the branch conduits. Branch conduits 41 and 42 project laterally from opposite sides of conduit 35, and an upright branch conduit 43 projects vertically therefrom. The intermediate portions of conduits 41 and 42 are reversely curved as at 41A and 42A and turned upwardly to provide a vertically extending section of approximately the same length as conduit 43. The curved portions 41A and 42A form feet which cooperate with conduit 35, when resting on a plane surface, to form a stable base for the module as is illustrated in FIG. 5, wherein conduit 35 is resting on the ground G and branch conduit 41 is shown providing a foot 41A for supporting the module structure. Conduit 42 similarly lends stability to this structure.

Individual plant-growing beds 31 are attached to the upper ends of the branch conduits and receive the fluid from reservoir 20 through the main and branch conduits respectively. Preferably, means are provided for detachably securing beds 31 to their supporting conduits and to also adjust their elevations thereon, and in the form shown, these means comprise threading the upper end segments of branch conduits 41, 42 and 43, as is illustrated at 41C in FIG. 6, and a nut 44 is threaded onto each branch conduit to a point approximately that desired for the elevation of the bottom walls of the bed. A resilient washer 45 is then placed about the conduit and against nut 44 after which a bed 31, which is formed having a central opening in the bottom wall to receive the threaded conduit end portion, is slipped onto the conduit and rested against the washer and nut. A second nut 46 is then threaded onto the conduit and is forced against the bottom wall of the bed to tightly clamp the bed between the nuts 44 and 46, washer 45 serving to prevent leakage of solution from the bed. It will be apparent that by backing off nut 46, nut 44 may be turned one direction or the other on the threaded conduit section whereby the elevation at which the bed 31 is positioned thereon can be closely adjusted. The elevation of beds 31 are adjusted so that the desired level of the solution therein lies in the plane of the surface of the liquid in the tank of regulator 23.

In the preferred embodiment of the invention shown, growing beds 31 are pot-shaped and may be formed of any suitable material, such as polyvinyl chloride, and preferably, openings 31A are formed in the sides adjacent to the top to limit the depth of solution on the plants in the beds should excess solution be inadvertently fed to the beds or excess rain water enter the beds. Preferably, a screen filter 47 is provided which rests on and covers substantially the entire bottom of each of the beds 31, a recessed portion 47A being formed therein to accommodate nut 46. The purpose of screen 47 is to prevent infiltration of the growing medium or root system of a plant in the bed into the branch conduit supporting the bed to avoid blocking the passage of fluid.

To promote aeration of the roots by the feeding solution or other liquid and to prevent an air lock in the conduits, main conduit 35 preferably is provided with breather means such as air vents which, in the form shown, comprise two vertically extending tubes 50 attached to the conduit and which communicate with the interior thereof and which tubes project somewhat above the level of beds 31. Foreign matter and rain are prevented from entering tubes 50 by turning their upper ends downwardly to permit the passage of air into and from the main conduit, and this excludes the air and other contamination which would otherwise fall into the open end. One of the tubes 50 is located between the last growing bed and the end of conduit 35 remote from the solution supply end so that air may enter or leave conduit 35 as liquid enters and leaves the conduit. The presence of air in the conduit also aerates the solution and enhances growth of the plants fed thereby.

It may be desirable to test the feed solution in conduits 35 from time to time, and to withdraw samples thereof a test plug 53 is provided in the bottom of main conduit 35. This plug is normally threaded into its opening. Also, it is desirable to be able to drain excess water from the conduit system, which may accumulate due to rainfall, and for this purpose a drain valve 52 is provided adjacent to one end of main conduit 35 in each module.

Figure 8:
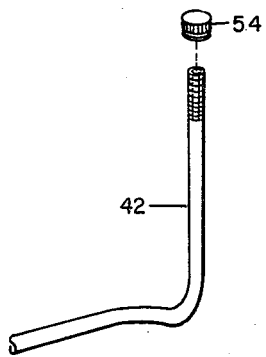
FIG. 8 is a fragmentary perspective view of a branch conduit without a growing bed attached thereto.

In some instances it may be desirable to remove individual beds 31 from their conduits and close such conduits to retain the system in operation, and in that event nut 46 is unthreaded from the branch conduit on which the bed to be removed is supported and, after the bed is removed, a closure cap 54 is then threaded onto the open end of the branch conduit to prevent loss of solution, as is illustrated in FIGS. 3 and 8.

Figure 9:
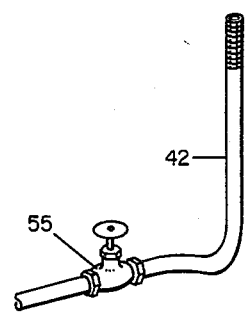
FIG. 9 is a view similar to FIG. 8 but showing another form of branch conduit.

In practice, it may be desirable to provide a hand valve, such as that shown at 55 in FIG. 9, in one or more of the branch conduits for controlling flow of solution to the particular bed attached to the conduit for close control of the feeding of the plant therein or for temporarily isolating the bed from the system, for example, and with this arrangement cap 54 can be dispensed with.

Figure 10:
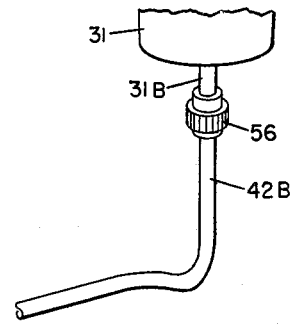
FIG. 10 is a fragmentary perspective view of a branch conduit of still another form.

Referring to FIG. 10, still another form of branch conduit is shown in which a coupling 56 is threaded to branch conduit 42B and to the lower end of a conduit section 31B attached to the bottom wall of a bed 31 whereby the bed, with the plant therein intact, can be removed by disconnecting the coupling. The coupling 56 would be removed and conduit 42B capped by a cap similar to cap 54.

In forming an hydroponic growing system of a plurality of modules, like module 30, the modules are disposed horizontally on a suitable surface and in end to end relation. The main conduits 35 thereof are then connected together in a series by couplings 37 or other suitable means. The end of the first module is coupled to outlet 24 of pressure regulator 23 and the remote end of the last module in the series is closed by a cap 36, as is illustrated in FIG. 1. The laterally projecting branch conduits 41 and 42 and main conduits 35 can be supported so as to cause the beds 31 to lie on an approximate level plane, and the elevation of the individual beds can be adjusted by nut 44 as described, if necessary, to provide the required level of solution in the respective beds when the solution is fed into the modules from the tank of regulator 23 through main conduits 35. The relatively rigid and self-supporting character of the modules 30 facilitates initial installation of a growing system inasmuch as the modules can be properly placed by a minimum of ground or surface preparation.

Figure 11:
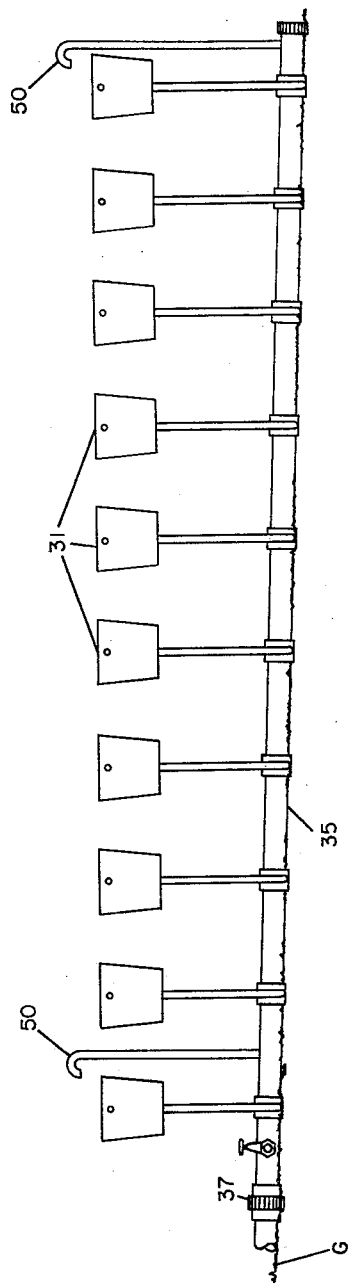
FIG. 11 is a side view, in elevation, of a module embodying the invention disposed on an inclined surface.

FIG. 11 illustrates a module 30 disposed on a slightly sloping surface, and the beds 31 are adjusted relative to their supporting branch conduits so as to lie in a common horizontal plane.

Figure 7:
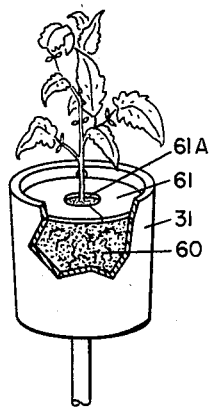
FIG. 7 is a view similar to FIG. 6 showing a plant in a growing bed.

As shown in FIG. 7, beds 31 preferably contain a suitable growing medium 60, such as vermiculite, in which seeds or seedlings are planted. Preferably, an impervious annular collar 61 of appropriate color, having a central opening 61A through which the plant stem extends, is placed in the beds to prevent development of plant disease caused by spores, micro-organisms, and other extraneous matter which might enter the beds, to provide relative retention of radiated heat to assist in retaining moisture in the growing medium between feedings, and to prevent surface erosion of the growing medium.

In use, the main reservoir 20 is filled with suitable solution containing the necessary plant nutrients, or it may be a plant treating or decontamination solution or fluid, and valve 22 is then opened to admit the solution into pressure regulator 23 from which it is discharged into conduit 35 and flows to the individual beds 31 and rises therein to the level corresponding to the level of the solution in regulator 23, as described hereinbefore. After an appropriate lapse of time in which the solution is maintained in the beds, the solution may be withdrawn from the beds and returned to reservoir 20 by closing valve 22, opening valve 27 and operating pump 26, which withdraws the solution from the conduit system and returns it to the main reservoir where the recovered solution may be tested and chemically fortified, if necessary, after which the solution is again flooded into the beds in the manner described hereinbefore.

It will be understood that the flooding and drainage of beds 31 by the solution may occur a number of times per day and such operations can be carried out automatically, as by the use of electronically or electrically operated time valves and pump control devices which are well known in the art, and, therefore, not shown here.

Should it be desirable to provide more than one series of modules 31, as may be seen in FIG. 2, each line or series is then connected with a pressure regulator like regulator 23 which in turn may be connected with a common main reservoir like reservoir 20 so that each series of modules may be subjected to the appropriate fluid pressure according to the particular elevation of the beds in each series. As seen in FIG. 2, a common pump 26 can be employed for returning the solution to the main reservoir in the manner described relative to the system shown in FIG. 1.

Figure 12:
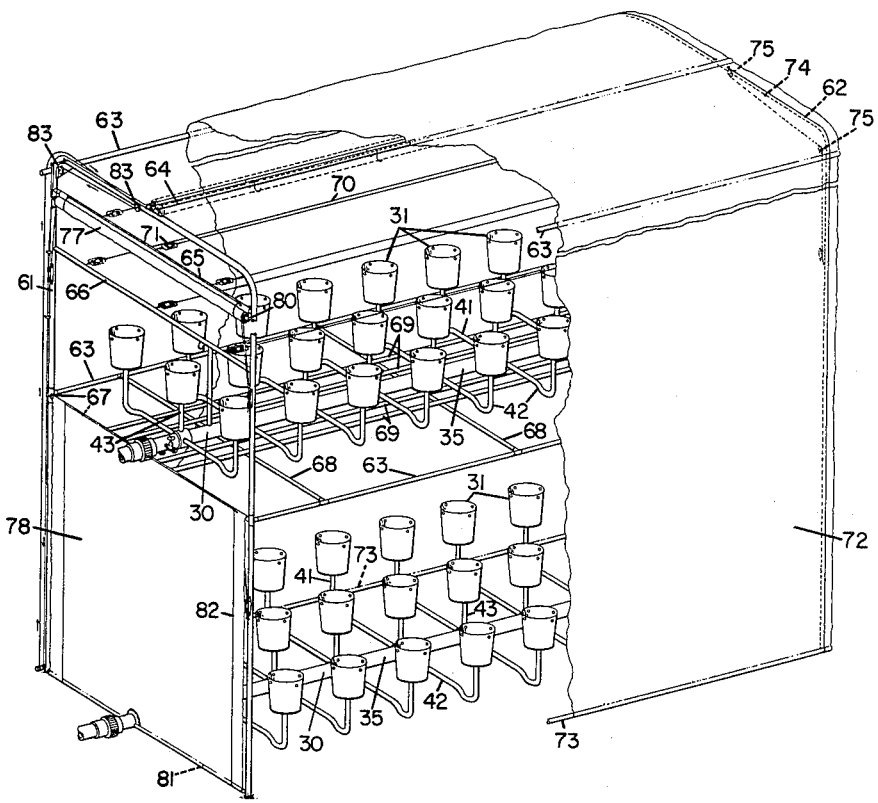
FIG. 12 is a perspective view, partly broken away, of tiered modules enclosed by a shield structure.
Figure 15:
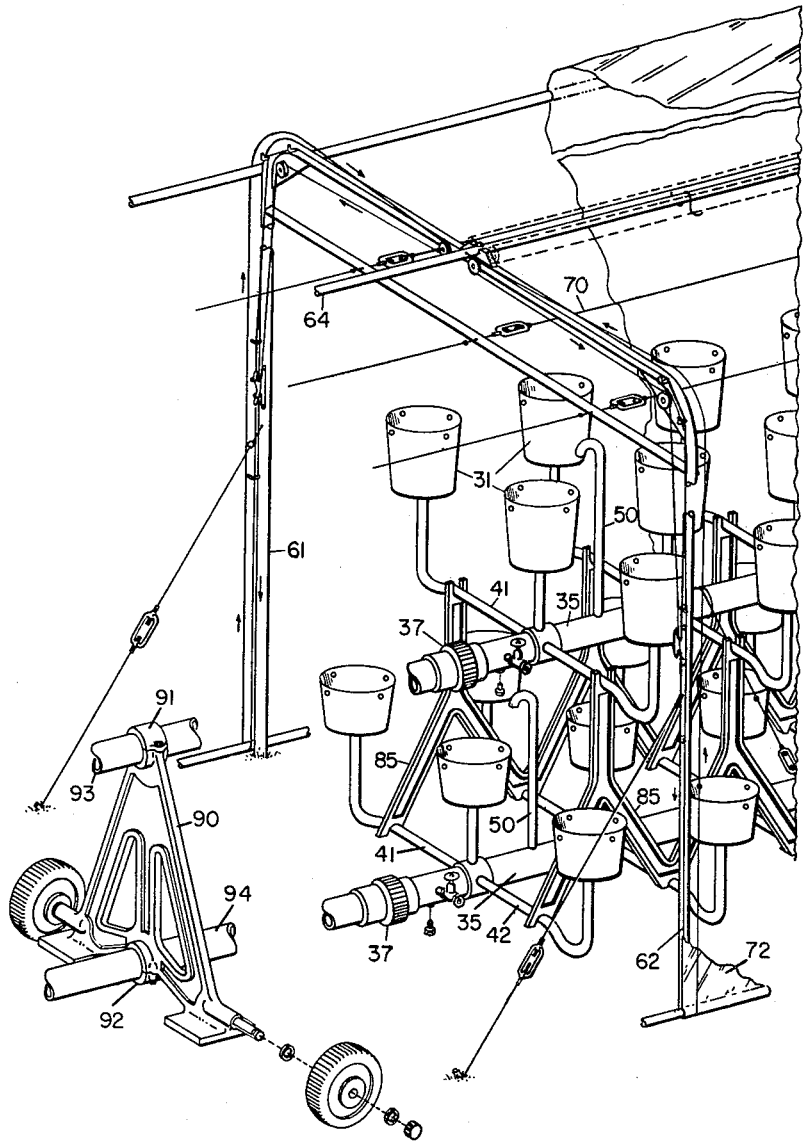
FIG. 15 is a fragmentary enlarged view of the apparatus shown in FIG. 13.

It will be appreciated that the modules can be assembled for use under many different circumstances; for example, they may be stacked relative to one another as shown in FIGS. 12, 13 and 15, wherein two modules 30 are shown, one supported above the other and enclosed by a shielding structure.

In the form shown in FIG. 12, the lower module 30 is resting on the ground and the upper module is supported on framework comprised of two similar inverted U-shape members 61 and 62 spaced apart approximately the length of the module and having the lower ends embedded in the ground for support thereof. The U-shape frame members are interconnected by four side rods 63 and a ridge rod 64, and the legs of each frame member are braced by transverse rods 65, 66 and 67. Side rods 63 are interconnected at suitable intervals therealong by transverse rods 68 on which the main conduit 35 of the upper module rests. The laterally projecting conduits 41 and 42 of the module are supported by rods 69 extending longitudinally of the framework and resting on cross rods 67 and 68, as shown. It will be understood that the solutions supplied to upper and lower modules will be at different head pressures, so that the levels of the solutions in beds 31 of the respective modules will be properly maintained.

To provide growing space for plants in the lower module, the two modules are staggered or offset longitudinally relative to one another so that the beds 31 in the lower module are out of vertical alignment with the beds in the upper module. Preferably, guide wires 70 are attached to cross members 65 and 66 to provide supports for certain types of plants growing from the beds. Turnbuckles 71 control the tautness of the guide wires.

It may be desirable to shield the growing plant from rain, heat, sun, wind, cold or pollution in the atmosphere or to provide a controlled growing environment by introduction of artificial light, heat, cooling, moisture, etc., and in that event, a sheet 72 of suitable material, such as a clear, opaque or dark plastic, as required, can be draped over the frame with the central portion attached to ridge rod 64 and the outer end edges having roller rods 73 attached thereto. Rods 73 are arranged to be rolled upwardly to the ridge rod 64, winding the sheet 72 thereon and uncovering the frame, by two suitable sets of draw cords 74 and pulleys 75, which are manipulated from opposite sides and ends of the frame, respectively, and which operate similarly to the well-known roll up type curtains or blinds. The end of the frame may be closed by sheets 77 and 78 similar to sheet 72, the upper edges being attached to cross rods 65 and 67, respectively, and the lower edges attached to roller rods 80 and 81 which may be rolled upwardly to wind the sheets thereon and open the end of the frame by cords 82 and pulleys 83.

Referring to the tiered arrangement of modules 30 shown in FIGS. 13 and 15, the lower module rests on the ground and the upper module is supported by inverted W-shape braces 85 notched in the ends at 85A to receive the lateral branch conduits 41 and 42 of the upper and lower modules, as shown.

It is apparent that the modules can be relatively easily transported and little, if any, preparation of the site is necessary to install a growing system of any convenient growing capacity. In some instances it may be desirable to provide mobility to the modules and in one form this may be accomplished by the provision of wheeled brackets 90 having clamp type bushings 91 and 92 in which rigid support conduits 93 and 94 are firmly secured, respectively, and which conduits are attached to the ends of adjacent serially arranged modules to form a support therefor as well as serving to provide a fluid interconnection between the conduits 35 of the modules.

By my invention, growing systems of convenient sizes may be readily installed in, under, on, or over various man-made and natural surfaces, including areas or sites unsuited for practical installations of previously known hydroponic growing systems, and the flexibility effected by the modular conduit and individual growing bed structures permits these installations to be readily moved from one site to another or to be dismantled and stored in a compact form.

The arrangement of the compact, closed conduit system and individual growing beds greatly reduces the volume of solution required for feeding any given number of plants, compared to previously known hydroponic systems. Further, since the only solution "lost" in the feeding process is that absorbed by the growing medium and the roots of the plants in the individual growing beds, a very large percentage of this minimum amount of total solution required is also recovered for re-use, which makes the apparatus covered by this invention exceedingly practical for use in areas where water is scarce.

The closed arrangement of the conduit system and individual growing beds, with relatively no exposure to air in the conduit system, reduces the possibility of airborne contamination within the apparatus and prevents the possibility of contamination in the system due to growth of algae, fungi, and other plant-growth inhibitors, thereby reducing the possibilities of plant diseases.

The compact modular arrangement of the apparatus permits greater productivity per unit volume and area than previously known systems of hydroponic growing. The growing beds and their solution-feeding conduit system permits close and effective control of the feeding, treating, and disinfecting of the growing plants and the equipment. The uniform spacing of the beds facilitates access to the plants growing therefrom so that harvesting crops from the plants is rapid and can be carried out without disturbing adjacent plants.

Although but several forms of the invention have been shown, it is to be understood that it may be embodied in other forms, modifications and adaptations, all falling within the scope of the claims which follow.

I claim:
1. An hydroponic growing system comprising a horizontally extending relatively rigid main pipe section, a plurality of branch pipes connected therewith and projecting laterally of each main pipe section and opening to the interior of said pipe section, certain of said pipes projecting vertically and certain other of said branch pipes projecting generally horizontally for forming a plurality of regular relatively closely spaced lateral supports for stabilizing said main pipe section against axial rotation, said horizontally projecting pipes having outer end portions turned to extend vertically, a plurality of pot-like beds attached to the outer ends of said branch pipes in upright positions with the open ends up and the bottom walls thereof lying in a substantially horizontal plane above said main pipe section, a liquid reservoir connected to said main pipe section, means to force liquid from said reservoir into said main pipe section and branch pipes and to withdraw liquid from said pipe section and pipes.

2. An hydroponic growing system comprising a horizontally extending pipe section, a plurality of branch pipes projecting laterally of each main pipe section and opening to the interior of said pipe section, a plurality of pot-like beds attached to the outer ends of said branch pipes, in upright position with the open ends up and having the bottom walls thereof in a substantially horizontal plane above said main pipe section, a liquid reservoir connected to said main pipe section, means to force liquid from said reservoir into said main pipe section and through said branch pipes into said beds and to withdraw liquid from said pipe section, pipes and beds, and means for admitting air to and expelling air from said main pipe section when the liquid is withdrawn and directed into said main pipe section, respectively.

3. An hydroponic growing system as set forth in claim 2 characterized by the last recited means comprising a tube extending vertically from said main pipe and connected with the interior thereof.

4. An hydroponic growing system comprising a horizontally extending relatively rigid main pipe section, a plurality of branch pipes connected therewith and projecting laterally of said main pipe section and opening to the interior of said pipe section, certain of said branch pipes forming a plurality of regular relatively closely spaced lateral supports for stabilizing said main pipe section, a plurality of pot-like beds attached to the outer ends of said branch pipes in upright positions with the open ends up, a liquid reservoir connected to said main pipe section, means to force liquid from said reservoir into said main pipe section and branch pipes into said beds and to withdraw liquid from said pipe section and pipes, and means for admitting air to and expelling air from said main pipe section when the liquid is withdrawn and directed into said main pipe section, respectively.

5. An hydroponic growing system comprising a horizontally extending relatively rigid main pipe section, a plurality of branch pipes connected therewith and projecting laterally of each main pipe section and opening to the interior of said pipe sections, certain of said pipes projecting vertically and certain other of said branch pipes projecting generally horizontally for forming a plurality of regular relatively closely spaced lateral supports for stabilizing said main pipe section against axial rotation, said horizontally projecting pipes having outer end portions turned to extend vertically, a plurality of pot-like beds attached to the outer ends of said branch pipes in upright positions with the open ends up and the bottom walls thereof lying in a substantially horizontal plane above said main pipe section, a liquid reservoir connected to said main pipe section, means to force liquid from said reservoir into said main pipe section and branch pipes and to withdraw liquid from said pipe section and pipes, and means for admitting air to and expelling air from said main pipe section when the liquid is withdrawn and directed into said main pipe section, respectively.

References Cited in the file of this patent

UNITED STATES PATENTS

| | | |
|---|---|---|
| 217,010 | Judson et al. | July 1, 1879 |
| 699,154 | DeForce | May 6, 1902 |
| 818,356 | Davis | Apr. 17, 1906 |
| 915,897 | Skorness | Mar. 23, 1909 |
| 926,119 | Holt | June 29, 1909 |
| 1,580,287 | Colle et al. | Apr. 13, 1926 |
| 2,051,461 | Lee | Aug. 18, 1936 |
| 2,060,735 | Krueger | Nov. 10, 1936 |
| 2,674,828 | Tegner | Apr. 13, 1954 |
| 2,803,923 | Pratt | Aug. 27, 1957 |
| 2,909,002 | Hendry | Oct. 20, 1959 |